United States Patent
Ietomi et al.

(10) Patent No.: US 12,445,150 B2
(45) Date of Patent: Oct. 14, 2025

(54) LOW-DENSITY PARITY-CHECK (LDPC) DATA DECODING USING ITERATION-VARIABLE ACCURACY

(71) Applicant: EDGECORTIX INC., Tokyo (JP)

(72) Inventors: Kunihiko Ietomi, Kanagawa (JP); Nikolay Nez, Tokyo (JP); Oleg Khavin, Tokyo (JP); Sakyasingha Dasgupta, Tokyo (JP)

(73) Assignee: EDGECORTIX INC., Tokyo (JP)

( * ) Notice: Subject to any disclaimer, the term of this patent is extended or adjusted under 35 U.S.C. 154(b) by 0 days.

(21) Appl. No.: 18/418,348

(22) Filed: Jan. 22, 2024

(65) Prior Publication Data

US 2024/0388310 A1 Nov. 21, 2024

Related U.S. Application Data

(60) Provisional application No. 63/502,417, filed on May 16, 2023.

(51) Int. Cl.
| | |
|---|---|
| *H03M 13/11* | (2006.01) |
| *G06F 17/16* | (2006.01) |
| *H04L 1/00* | (2006.01) |

(52) U.S. Cl.
CPC ......... *H03M 13/1125* (2013.01); *G06F 17/16* (2013.01); *H03M 13/118* (2013.01); *H04L 1/0057* (2013.01)

(58) Field of Classification Search
CPC ........... H03M 13/1125; H03M 13/118; H03M 13/1128; H03M 13/116; G06F 17/16; H04L 1/0057
See application file for complete search history.

(56) References Cited

U.S. PATENT DOCUMENTS

| | | | |
|---|---|---|---|
| 7,181,676 B2 | 2/2007 | Hocevar | |
| 8,887,030 B2 * | 11/2014 | Loghin | H04L 1/0068 |
| | | | 714/776 |

(Continued)

FOREIGN PATENT DOCUMENTS

| | | |
|---|---|---|
| EP | 2892157 A1 | 7/2015 |
| JP | 2013070133 A | 4/2013 |

OTHER PUBLICATIONS

Dong Zi-jian, "Reliability-based iterative decoding of LDPC codes using segmented accumulation of likelihood ratio," 2010 3rd International Conference on Advanced Computer Theory and Engineering(ICACTE), Chengdu, China, 2010.*

(Continued)

*Primary Examiner* — Steve N Nguyen
(74) *Attorney, Agent, or Firm* — HAUPTMAN HAM, LLP

(57) ABSTRACT

Low-Density Parity-Check (LDPC) data decoding using iteration-variable accuracy is performed by segmenting a LDPC encoded data block of probability values by dividing the LDPC encoded data block into a plurality of data probability value segments and a plurality of parity probability value segments, each probability value of the LDPC encoded data block representing a likelihood between binary values, decoding the LDPC encoded data block by adjusting, according to an iteration-variable accuracy parameter, the probability values of the LDPC encoded data block based on a parity-check matrix, the parity-check matrix defining correspondence among data probability value segments and parity probability value segments, and concatenating likely binary values that satisfy the parity-check matrix associated with the probability values of each data probability value segment to form a decoded data block. The iteration-variable (Continued)

accuracy parameter represents a tradeoff between accuracy and computational efficiency.

17 Claims, 8 Drawing Sheets

(56) References Cited

U.S. PATENT DOCUMENTS

| | | | |
|---|---|---|---|
| 9,444,582 B2* | 9/2016 | Stadelmeier | H04L 1/0058 |
| 11,233,528 B1 | 1/2022 | Djurdjevic et al. | |
| 12,238,724 B1* | 2/2025 | Afshar | H04L 1/0057 |
| 2006/0015802 A1* | 1/2006 | Hocevar | H03M 13/616 |
| | | | 714/805 |
| 2006/0242533 A1 | 10/2006 | Lee et al. | |
| 2008/0028274 A1* | 1/2008 | Lin | H03M 13/1111 |
| | | | 714/752 |
| 2010/0195571 A1* | 8/2010 | Kuri | H03M 13/1102 |
| | | | 714/752 |
| 2011/0239080 A1* | 9/2011 | Sakaue | H03M 13/116 |
| | | | 714/752 |
| 2020/0186167 A1* | 6/2020 | Noh | H04L 1/0041 |
| 2021/0111738 A1* | 4/2021 | Vanaparthy | H03M 13/1137 |

OTHER PUBLICATIONS

Hagiwara, "Code Theory", 1st Edition, Nippon Hyoronsha Co., Ltd. , Japan, Aug. 10, 2012, pp. 195-204,234-235, <ISBN:978-4-535-78664-6>. 17pp.

Wadayama, "Fundamentals of Error Correction Technology", 1st Edition, Morikita Publishing Co., Ltd. Japan, Jul. 6, 2010, pp. 182-183, <ISBN:978-4-627-81731-9>. 5pp.

Office Action in JP Application No. 2024-078525, mailed Sep. 3, 2024. 8pp.

Wen Ji et al. "A Novel Hardware-Friendly Self-Adjustable Offset Min-Sum Algorithm for ISDB-S2 LDPC Decoder" 18th European Signal Processing Conference (EUSIPCO-2010), ISSN 2076-1465, Aug. 23-27, 2010. p. 1394-p. 1398, PP5.

* cited by examiner

LOW-DENSITY PARITY-CHECK (LDPC) DATA DECODING USING ITERATION-VARIABLE ACCURACY

BACKGROUND

Wireless data communication has become ubiquitous in modern society. As digital data transmission became more prevalent, the utility of reliable and error-free communication over noisy wireless channels became apparent. This led to the creation of forward error correction (FEC) codes. FEC codes are mathematical algorithms used to add redundant information to transmitted data, allowing the receiver to correct errors that may occur during transmission. FEC codes became essential as wireless communication systems expanded, especially with the advent of mobile phones and data-intensive applications. Without FEC, wireless data transmission would suffer from higher error rates, leading to data corruption and costly retransmissions. FEC codes, like Low-Density Parity-Check (LDPC) codes, are integral components of modern wireless technologies, improving data integrity and reducing the impact of channel impairments, making wireless communication reliable and efficient.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
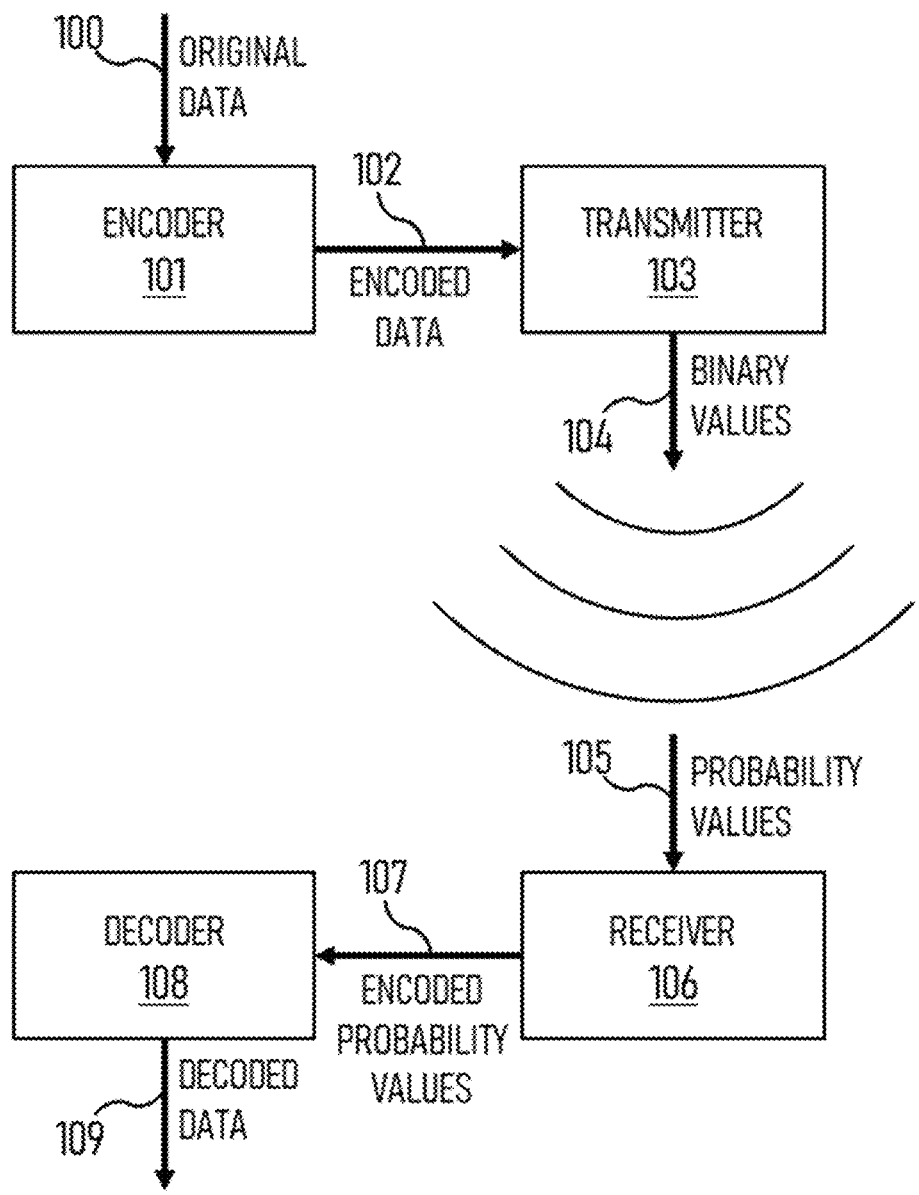
FIG. 1 is a schematic diagram of a system for Low-Density Parity-Check (LDPC) data transmission, according to at least one embodiment of the present invention.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Efficient decoding of data encoded with FEC codes plays a crucial role in the spread of wireless communication to the vast and diverse array of connected devices, many of which have limited power and processing capabilities, such as IoT (Internet of Things) devices.

FIG. 1 is a schematic diagram of a system for Low-Density Parity-Check (LDPC) data transmission, according to at least one embodiment of the present invention. The system includes an encoder 101, a transmitter 103, a receiver 106, and a decoder 108. In at least some embodiments, encoder 101 and transmitter 103 are parts of a single device, such as a transmission tower of a radio access network. In at least some embodiments, receiver 106 and decoder 108 are parts of a single device, such as a smartphone in communication with a radio access network. In at least some embodiments, such single devices have an encoder, a transmitter, a receiver, and a decoder, enabling bi-directional communication. In FIG. 1, because transmitter 103 is in direct communication with receiver 106, encoder 101 and transmitter 103 would not be part of the same device as receiver 106 and decoder 108.

Encoder 101 is configured to receive original data 100, and to transmit encoded data 102 to transmitter 103. In at least some embodiments, encoder 101 is configured to receive original data 100 in blocks of one or more predetermined lengths. In at least some embodiments, encoder 101 is configured to apply FEC encoding to original data 100 to produce encoded data 102. In at least some embodiments, encoder 101 is configured to apply LDPC encoding to original data 100 to produce encoded data 102. In at least some embodiments, encoder 101 is an integrated circuit, such as a Field-Programmable Gate Array (FPGA), Application Specific Integrated Circuit (ASIC), etc. In at least some embodiments, encoder 101 is a computer having a processor and a memory storing instructions for execution by the processor.

Transmitter 103 is configured to receive encoded data 102 from encoder 101, and to transmit binary values 104 of encoded data 102 to receiver 106 through wireless communication. In at least some embodiments, transmitter 103 is configured to transmit encoded data 102 in blocks of one or more predetermined lengths. In at least some embodiments, transmitter 103 is configured to transmit binary values 104 according to a standard wireless protocol, such as 5G, BLUETOOTH, BLE, WiFi, 3G GPRS, 3G EVDO, 3G HSPA, 4G WiMAX, 4G E-UTRAN (LTE), etc. Although not all of the foregoing standards currently utilize LDPC, such as 3G and 4G, transmitter 103 includes configuration for multiple standard wireless protocols in at least some embodiments. In at least some embodiments, transmitter 103 is configured to transmit at a frequency and a timing scheme according to a standard wireless protocol. In at least some embodiments, transmitter 103 is configured to transmit binary values 104 through a data channel, and to transmit other information for decoding encoded data 102, such as information representing a parity-check matrix, through a control channel.

Receiver 106 is configured to receive probability values 105 through wireless reception, and to transmit encoded probability values 107 to decoder 108. In at least some embodiments, receiver 106 is configured to record probability values 105 in attempting to receive binary values 104, probability values 105 representing one or more probabilities of whether a received binary value represents a one or a zero from the transmission of binary values 104 as transmitted by transmitter 103. In at least some embodiments, receiver 106 records probability values having a confidence proportional to a signal-to-noise ratio during reception. In at least some embodiments, receiver 106 is configured to record more confident probability values during instances of higher signal-to-noise ratios, and less confident probability values during instances of lower signal-to-noise ratios. In at least some embodiments, the received values are represented as follows:

$$z_i = y_i + n_i \quad \text{EQ. 1}$$

where $z_i$ represents the received values, $y_i$ represents the transmitted values, $n_i$ represents the Additive White Gaussian Noise (AWGN), and i is 1 to N, where N is the quantity of encoded probability values received. In at least some embodiments, receiver 106 converts the received values into the Log-Likelihood Ratio (LLR) domain as follows:

$$LLR(z_i) = \log\left(\frac{p(z_i \mid y_i = 0)}{p(z_i \mid y_i = 1)}\right) \quad \text{EQ. 2}$$

where $p(z_i|y_i=0)$ is the probability that the received value is zero, and $p(z_i|y_i=1)$ is the probability that the received value is one. In at least some embodiments, use of LLR values allows probability values to be added, and the absolute value of LLR indicates confidence of the probability.

In at least some embodiments, receiver 106 is configured to use multiple bits of data to record one or more probability values among probability values 105 corresponding to one binary value among binary values 104. In at least some embodiments, the number of bits of data used to record each probability value among probability values 105 depends on the hardware capabilities of receiver 106 or decoder 108. In at least some embodiments, receiver 106 is configured to use six bits of data to record one or more probability values among probability values 105 corresponding to one binary value among binary values 104. In at least some embodiments, receiver 106 is configured to receive probability values 105 in blocks of one or more predetermined lengths. In at least some embodiments, receiver 106 is configured to assemble probability values 105 into encoded probability values 107 using a format that clarifies correspondence between probability values among encoded probability values 107 and binary values among encoded data 102. In at least some embodiments, receiver 106 is configured to receive probability values 105 through a data channel, and to receive other information for decoding encoded data 102, such as information representing a parity-check matrix, through a control channel.

Decoder 108 is configured to receive encoded probability values 107 from receiver 106, and to output decoded data 109. In at least some embodiments, decoder 108 is configured to decode encoded probability values 107 into decoded data 109. In at least some embodiments, decoder 108 is configured to apply FEC decoding to encoded probability values 107 to produce decoded data 109. In at least some embodiments, decoder 108 is configured to apply LDPC decoding to encoded probability values 107 to produce decoded data 109. In at least some embodiments, decoder 108 is an integrated circuit, such as an FPGA, ASIC, etc. In at least some embodiments, decoder 108 is a computer having a processor and a memory storing instructions for execution by the processor.

Figure 2:
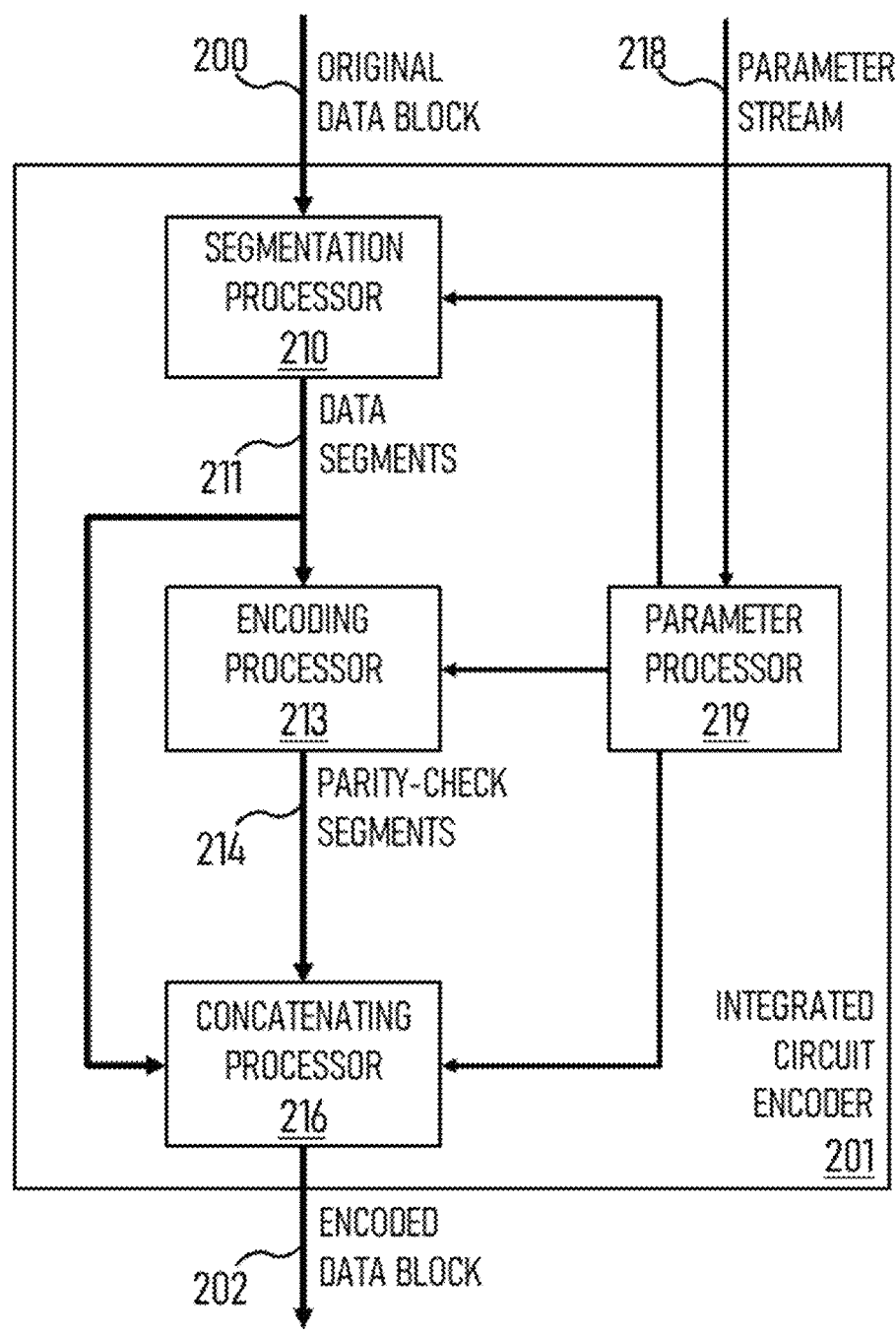
FIG. 2 is a schematic diagram of an integrated circuit encoder for LDPC data encoding, according to at least one embodiment of the present invention.

FIG. 2 is a schematic diagram of an integrated circuit encoder 201 for LDPC data encoding, according to at least one embodiment of the present invention. Integrated circuit encoder 201 includes segmentation processor 210, encoding processor 213, concatenating processor 216, and parameter processor 219.

Segmentation processor 210 is configured to receive original data block 200, and to transmit data segments 211 to encoding processor 213 and concatenating processor 216. In at least some embodiments, segmentation processor 210 is configured to divide an original block of data into a plurality of data segments. In at least some embodiments, segmentation processor 210 is configured to divide original data block 200 into segments of one or more predetermined lengths. In at least some embodiments, segmentation processor 210 is configured to divide original data block 200 into segments having a length according to the length of original data block 200. In at least some embodiments, segmentation processor 210 is configured to divide an original block of data into a plurality of data segments in accordance with columns of an LDPC base graph. In at least some embodiments, original data block 200 corresponds to an "information block" in the 5G standard, the information block being the result of prior segmentation, which is not performed by segmentation processor 210, of a transport block.

Encoding processor 213 is configured to receive data segments 211, and to transmit parity segments 214 to concatenating processor 216. In at least some embodiments, encoding processor 213 is configured to apply a parity-check matrix to data segments 211 to produce parity segments 214. In at least some embodiments, encoding processor 213 is configured to apply an LDPC parity-check matrix to data segments 211 to produce parity segments 214. In at least some embodiments, encoding processor 213 is configured to apply one or more circular shifts to each data segment 211 according to the parity-check matrix to produce parity segments 214. In at least some embodiments, encoding processor 213 is configured to apply one or more circular shifts to some parity segments, such as "core" parity segments, among parity segments 214 according to the parity-check matrix to produce other parity segments among parity segments 214. In at least some embodiments, encoding processor 213 is configured to populate cach bit of cach parity segment with values such that a sum total of the bit and binary values in a subset of values of one or more data segments and other parity segments corresponding to the bit is even.

Concatenating processor 216 is configured to receive data segments 211 and parity segments 214, and to output encoded data block 202. In at least some embodiments, concatenating processor 216 is configured to concatenate data segments 211 with parity segments 214 to produce encoded data block 202. In at least some embodiments, concatenating processor 216 is configured to concatenate data segments 211 with parity segments 214 into a format that clarifies correspondence between subsets of values of data segments 211 and parity segments 214.

Parameter processor 219 is configured to receive parameter stream 218, and transmit information to segmentation processor 210, encoding processor 213, and concatenating processor 216. In at least some embodiments, parameter processor 219 is configured to receive parameter stream 218 through a control channel. In at least some embodiments, parameter processor 219 is configured to receive information representing a parity-check matrix corresponding to original data block 200 within parameter stream 218. In at least some embodiments, parameter processor 219 is configured to transmit relevant parameters to each of segmentation processor 210, encoding processor 213, and concatenating processor 216. In at least some embodiments, parameter processor 219 is configured to transmit information representing a segment size to segmentation processor 210. In at least some embodiments, parameter processor 219 is configured to transmit information representing the parity-check matrix corresponding to original data block 200 to encoding processor 213. In at least some embodiments, parameter processor 219 is configured to transmit information representing the parity-check matrix corresponding to original data block 200 to concatenating processor 216.

Figure 3:
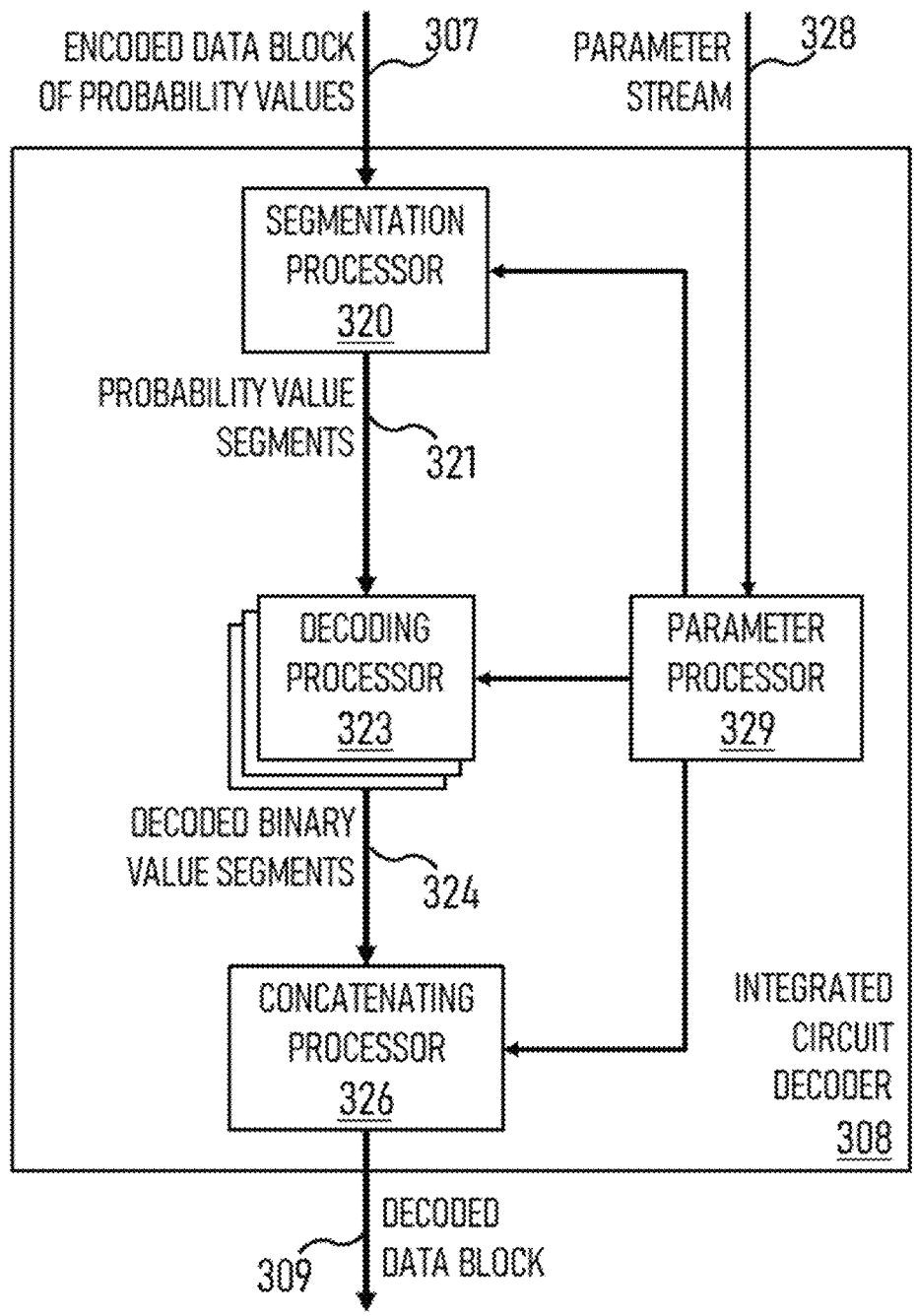
FIG. 3 is a schematic diagram of an integrated circuit decoder for LDPC data decoding, according to at least one embodiment of the present invention.

FIG. 3 is a schematic diagram of an integrated circuit decoder 308 for LDPC data decoding, according to at least one embodiment of the present invention. Integrated circuit decoder 308 includes segmentation processor 320, one or more decoding processors 323, concatenating processor 326, and parameter processor 329.

Segmentation processor 320 is configured to receive encoded data block of probability values 307, and to transmit probability value segments 321 to decoding processors 323. In at least some embodiments, probability value segments 321 includes data probability value segments and parity probability value segments. In at least some embodiments, segmentation processor 320 is configured to divide an encoded data block of probability values into a plurality of data probability value segments and a plurality of parity probability value segments, each probability value of the encoded data block representing a likelihood between binary values. In at least some embodiments, segmentation processor 320 is configured to divide encoded data block of probability values 307 into segments of one or more predetermined lengths. In at least some embodiments, segmentation processor 320 is configured to divide encoded data block of probability values 307 into segments having a length according to the length of encoded data block of probability values 307.

Decoding processors 323 are each configured to receive probability value segments 321, and to transmit decoded binary value segments 324 to concatenating processor 326. In at least some embodiments, each decoding processor 323 is configured to adjust, according to an iteration-variable accuracy parameter, probability values of the encoded data block based on a parity-check matrix, the parity-check matrix defining correspondence among data probability value segments and parity probability value segments, wherein the iteration-variable accuracy parameter represents a tradeoff between accuracy and computational efficiency. In at least some embodiments, decoding processors 323 are each configured to apply a parity-check matrix to probability value segments 321 to produce decoded binary value segments 324. In at least some embodiments, decoding processors 323 are each configured to apply an LDPC parity-check matrix to probability value segments 321 to produce decoded binary value segments 324. In at least some embodiments, decoding processors 323 are each configured to apply one or more circular shifts to each data probability value segment and each parity probability value segment among probability value segments 321 according to the parity-check matrix to produce decoded binary value segments 324. In at least some embodiments, decoding processors 323 are each configured to compare binary values in a subset of values of corresponding data probability value segments and parity probability value segments to ensure that a sum total of the values is even. In at least some embodiments, each of decoding processors 323 includes a sorter for sorting probability values into segments and finding the minimum value(s), a calculator for calculating update values from the minimum value(s), a function selector for selecting the correct function for determining an adjustment amount based on the minimum value(s), and an accuracy parameter selector for selecting the iteration-variable accuracy parameter.

Concatenating processor 326 is configured to receive decoded binary value segments 324, and to output decoded data block 309. In at least some embodiments, concatenating processor 326 is configured to concatenate the likely binary values that satisfy the parity-check matrix associated with the probability values of each data probability value segment to form a decoded data block. In at least some embodiments, concatenating processor 326 is configured to concatenate decoded binary value segments 324 to produce decoded data block 309. In at least some embodiments, concatenating processor 326 is configured to concatenate decoded binary value segments 324 into a format identical to the original block of data.

Parameter processor 329 is configured to receive parameter stream 328, and transmit information to segmentation processor 320, decoding processors 323, and concatenating processor 326. In at least some embodiments, parameter processor 329 is configured to transmit a plurality of parameters to each of the segmentation processor, the decoding processor, and the concatenating processor, wherein the plurality of parameters corresponds to the encoded data block. In at least some embodiments, parameter processor 329 is configured to receive parameter stream 328 through a control channel. In at least some embodiments, parameter processor 329 is configured to receive information representing a parity-check matrix corresponding to encoded data block of probability values 307 within parameter stream 328. In at least some embodiments, parameter processor 329 is configured to transmit relevant parameters to each of segmentation processor 320, decoding processors 323, and concatenating processor 326. In at least some embodiments, parameter processor 329 is configured to transmit information representing a segment size to segmentation processor 320. In at least some embodiments, parameter processor 329 is configured to transmit information representing the parity-check matrix corresponding to encoded data block of probability values 307 to decoding processors 323. In at least some embodiments, parameter processor 329 is configured to transmit information representing the parity-check matrix corresponding to encoded data block of probability values 307 to concatenating processor 326.

Figure 4:
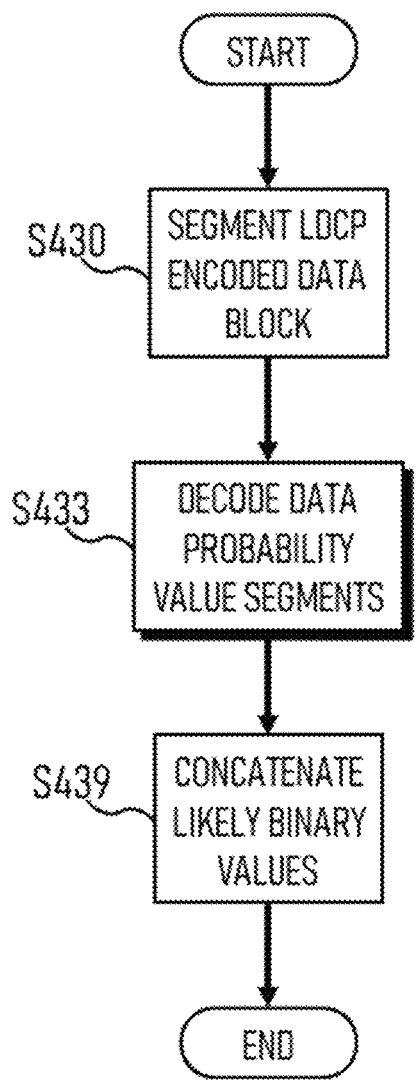
FIG. 4 is an operational flow for LDPC data decoding using iteration-variable accuracy, according to at least one embodiment of the present invention.

FIG. 4 is an operational flow for LDPC data decoding using iteration-variable accuracy, according to at least one embodiment of the present invention. The operational flow provides a method of LDPC data decoding using iteration-variable accuracy. In at least some embodiments, the method is performed by one or more decoding processors of an integrated circuit, such as decoding processors 323 shown in FIG. 3, or a controller of a decoder including sections for performing certain operations, such as the controller and decoder shown in FIG. 8, which will be explained hereinafter.

At S430, a segmenting section of the controller segments an LDCP encoded data block. In at least some embodiments, the segmenting section segments a Low-Density Parity-Check (LDPC) encoded data block of probability values by dividing the encoded data block into a plurality of data probability value segments and a plurality of parity probability value segments, each probability value of the encoded data block representing a likelihood between binary values. In at least some embodiments, the segmenting section divides the encoded data block into segments of one or more predetermined lengths. In at least some embodiments, the segmenting section divides the encoded data block into segments having a length according to the length of the encoded data block.

At S433, a decoding section of the controller decodes the data probability value segments. In at least some embodiments, the decoding section applies a parity-check matrix to the data probability value segments and the parity probability value segments to produce decoded binary value segments. In at least some embodiments, the decoding section applies an LDPC parity-check matrix to the data probability value segments and the parity probability value segments to produce the decoded binary value segments. In at least some embodiments, the decoding section applies one or more circular shifts to the data probability value segments and parity probability value segments according to the parity-check matrix to produce the decoded binary value segments. In at least some embodiments, the decoding section compares binary values in a subset of values of corresponding data probability value segments and parity probability value segments to ensure that a sum total of the values is even. In at least some embodiments, the decoding section decodes the encoded data block by adjusting, according to an iteration-variable accuracy parameter, probability values of the encoded data block based on a parity-check matrix, the parity-check matrix defining correspondence among data probability value segments and parity probability value segments, wherein the iteration-variable accuracy parameter represents a tradeoff between accuracy and computational efficiency. In at least some embodiments, the decoding section performs the operational flow shown in FIG. 5, which will be explained hereinafter.

At S439, a concatenating section concatenates likely binary values. In at least some embodiments, the concatenating section concatenates the likely binary values that satisfy the parity-check matrix associated with the probability values of each data probability value segment to form a decoded data block. In at least some embodiments, the concatenating section concatenates likely binary value segments to produce the decoded data block. In at least some embodiments, the concatenating section concatenates likely binary value segments into a format identical to an original block of data.

Figure 5:
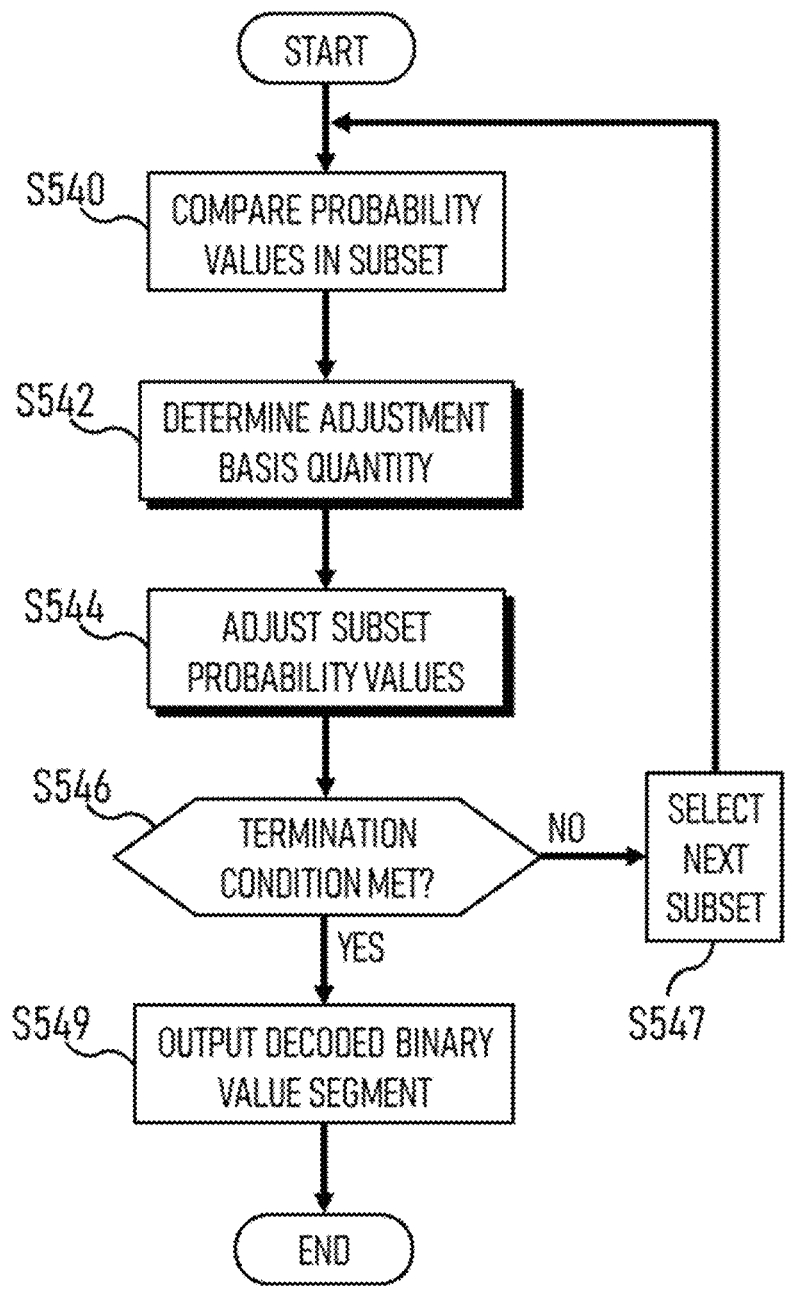
FIG. 5 is an operational flow for data probability value segment decoding, according to at least one embodiment of the present invention.

FIG. 5 is an operational flow for data probability value segment decoding, according to at least one embodiment of the present invention. The operational flow provides a method of decoding a data probability value segment. In at least some embodiments, the method is performed by one or more decoding processors of an integrated circuit, such as decoding processors 323 shown in FIG. 3, a decoding section of a decoder, such as the decoding section shown in FIG. 8, which will be explained hereinafter.

At S540, the decoding section or a sub-section thereof compares probability values in a subset. In at least some embodiments, the decoding section compares the subset of probability values from one or more data probability value segments and the corresponding parity probability value segments. In at least some embodiments, as iterations proceed, the decoding section compares subsets of probability values, each subset including probability values that are related according to the parity-check matrix, the related probability values of each subset being from corresponding data probability value segments and parity probability value segments. In at least some embodiments, the decoding section refers to a parity-check matrix to determine which values of the data probability value segments and the parity probability value segments belong to each subset. In at least some embodiments, each row of the parity-check matrix defines a subset of values of the data probability value segments and the parity probability value segments. In at least some embodiments, the probability values of each subset correspond to original binary values, a sum total of which is even. In at least some embodiments, each probability value is included in more than one subset.

At S542, the decoding section or a sub-section thereof determines an adjustment basis quantity. In at least some embodiments, the decoding section determines an adjustment basis quantity representing a quantity of minimum confidence probability values among the other probability values in the subset on which to base the adjusting. In at least some embodiments, as iterations proceed, the decoding section determines, for each subset, an adjustment basis quantity, the adjustment basis quantity representing a quantity of minimum confidence probability values among the other probability values in the subset on which to base the adjusting. In at least some embodiments, a quantity of the one or more minimum confidence probability values is the adjustment basis quantity. In at least some embodiments, the adjustment basis quantity is less than or equal to a quantity of the other probability values in the subset. In at least some embodiments, the decoding section determines a fixed adjustment basis quantity for the first iteration of each subset. In at least some embodiments, the decoding section performs the operational flow shown in FIG. 6, which will be explained hereinafter, for each subsequent iteration of each subset.

At S544, the decoding section or a sub-section thereof adjusts probability values of the subset. In at least some embodiments, the decoding section adjusts each probability value in the subset based on one or more minimum confidence probability values among other probability values in the subset. In at least some embodiments, the decoding section performs iterations of adjusting cach probability value in each subset. In at least some embodiments, as iterations proceed, the decoding section adjusts each probability value in each subset based on one or more minimum confidence probability values among other probability values in the subset. In at least some embodiments, the decoding section performs the operational flow shown in FIG. 7, which will be explained hereinafter.

At S546, the decoding section or a sub-section thereof determines whether a termination condition is met. In at least some embodiments, the decoding section determines that the termination condition is met in response to the parity-check matrix being satisfied or in response to performing a predetermined number of iterations. In at least some embodiments, the iterations of adjusting are performed until likely binary values associated with the probability values satisfy the parity-check matrix or until a predetermined number of iterations are performed. In at least some embodiments, the decoding section determines that the parity-check matrix is satisfied in response to determining that a sum total of the likely binary values in each subset is even. In at least some embodiments, the decoding section determines that the parity-check matrix is satisfied in response to determining that that a sum total of the likely binary values in each subset is even in consecutive iterations. In response to the decoding section determining that the termination condition is not yet met, the operational flow returns to probability value comparison at S540 after selecting the next subset (S547). In response to the decoding section determining that the termination condition is met, the operational flow proceeds to decoded binary value segment output at S549.

At S549, the decoding section or a sub-section thereof outputs decoded binary value segment. In at least some embodiments, the decoded binary value segment includes the likely binary values according to the finally adjusted probability values of the data probability value segment. In at least some embodiments, the decoding section transmits the decoded binary value segment to a concatenating section for concatenation of decoded binary value segments. In at least some embodiments, subsets may be processed in parallel where there is no codependency among the subsets. In at least some embodiments, data probability value segments and parity probability value segments in correspondence according to the parity-check matrix are processed in parallel.

Figure 6:
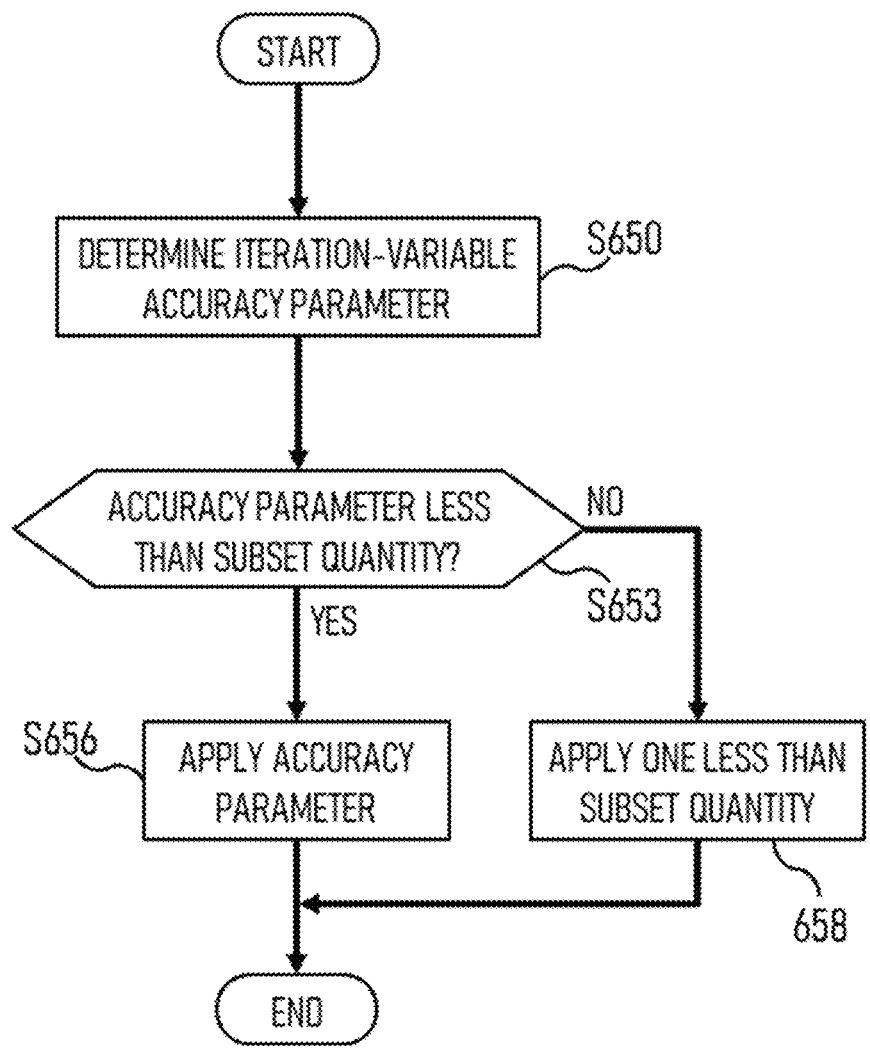
FIG. 6 an operational flow for adjustment basis quantity determination, according to at least one embodiment of the present invention.

FIG. 6 an operational flow for adjustment basis quantity determination, according to at least one embodiment of the present invention. The operational flow provides a method of determining an adjustment basis quantity. In at least some embodiments, the method is performed by one or more decoding processors of an integrated circuit, such as decoding processors 323 shown in FIG. 3, a decoding section of a decoder, such as the decoding section shown in FIG. 8, which will be explained hereinafter.

At S650, the decoding section or a sub-section thereof obtains an iteration-variable accuracy parameter. In at least some embodiments, the decoding section determines the iteration-variable accuracy parameter based on an iteration value and an error rate of the previous iteration. In at least some embodiments, the decoding section determines, for each subsequent iteration of adjusting, the iteration-variable accuracy parameter based on an iteration value and an error rate of at least the previous iteration. In at least some embodiments, the iteration-variable accuracy parameter is represented as follows:

$$J'_k = f(k, E_{k-1}) \qquad \text{EQ. 3}$$

where $J'_k$ represents the iteration-variable accuracy parameter of the current iteration, k represents the iteration, and $E_{k-1}$ represents the error rate of the previous iteration. In at least some embodiments, the decoding section determines the iteration-variable accuracy parameter such that the iteration-variable accuracy parameter increases as the number of iterations increases and in response to a high error rate. In at least some embodiments, the error rate is a proportion of subsets in which the sum total of the likely binary values in the subset is even to all of the subsets. In at least some embodiments, the error rate is a proportion of probability values in subsets in which the sum total of the likely binary values in the subset is not even to all of the probability values. In at least some embodiments, the decoding section determines the iteration-variable accuracy parameter based on other decoder parameters alone or in addition to the iteration value and the error rate of at least the previous iteration. In at least some embodiments, the decoding section determines the iteration-variable accuracy parameter further based on a signal-to-noise ratio alone or in addition to the iteration value, the error rate of at least the previous iteration, or both. In at least some embodiments, the decoding section or a decoding processor includes a Look-Up Table (LUT) in which iteration-variable accuracy parameter values are associated with corresponding iteration values and error rate values.

At S653, the decoding section determines whether the iteration-variable accuracy parameter is less than a quantity of probability values in the subset. In response to the decoding section determining that the iteration-variable accuracy parameter is less than a quantity of probability values in the subset, the operational flow proceeds to accuracy parameter application at S656. In response to the decoding section determining that the iteration-variable accuracy parameter is not less than a quantity of probability values in the subset, the operational flow proceeds to application of an adjustment quantity equal to one less than the subset quantity at S658.

At S656, the decoding section or a sub-section thereof applies the accuracy parameter as the adjustment quantity. At S658, the decoding section or a sub-section thereof applies, as the adjustment quantity, one less than a quantity of probability values in the subset. In other words, the decoding section applies an adjustment basis quantity that is the lesser between the iteration-variable accuracy parameter and one less than a quantity of probability values in the subset. In at least some embodiments, the operations of S653, S656, and S658 are represented as follows:

$$J = \min(J', (I-1)) \qquad \text{EQ. 4}$$

where J represents adjustment basis quantity, and I represents the quantity of probability values in the subset.

Figure 7:
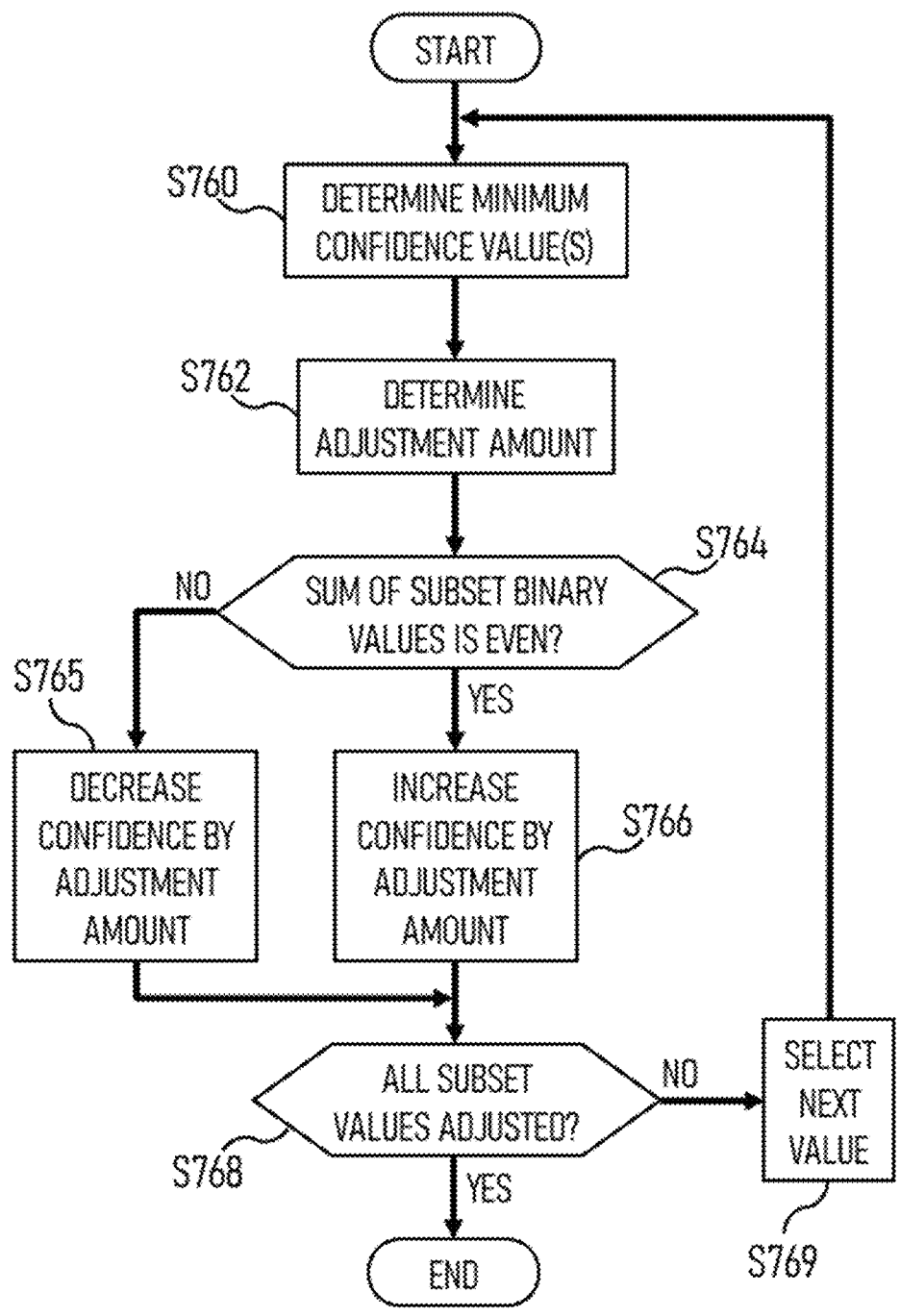
FIG. 7 an operational flow for subset probability value adjustment, according to at least one embodiment of the present invention.

FIG. 7 an operational flow for subset probability value adjustment, according to at least one embodiment of the present invention. The operational flow provides a method of adjusting subset probability values. In at least some embodiments, the method is performed by one or more decoding processors of an integrated circuit, such as decoding processors 323 shown in FIG. 3, a decoding section of a decoder, such as the decoding section shown in FIG. 8, which will be explained hereinafter.

At S760, the decoding section or a sub-section thereof determines one or more minimum confidence values. In at least some embodiments, the decoding section determines one or more minimum confidence values in the subset other than a selected value. In at least some embodiments, the decoding section determines which other probability values in the subset have the lowest confidence value. In at least some embodiments, each probability value is represented by an LLR. In at least some embodiments, an LLR value is positive if the probability of being a 0 is higher than the probability of being a 1 and negative if the probability of being a one is higher than the probability of being a zero, consistent with EQ. 2. In at least some embodiments, the absolute value of an LLR value indicates the confidence. In at least some embodiments, the decoding section determines which probability values in the subset have the lowest confidence value based on the absolute values of the LLR values. In at least some embodiments, the decoding section determines which probability values in the subset have the lowest confidence value based on the absolute values of a β value of each LLR value, where the decoding section determines beta values as follows:

$$\beta_{mn} = LLR_n - \alpha_{mn} \qquad \text{EQ. 5}$$

where $LLR_n$ represents the LLR value at column n of the parity-check matrix, $\alpha_{mn}$ represents the adjustment value of $LLR_n$ from the immediately preceding iteration of probability value adjustment for the subset of row m, and $\beta_{mn}$ represents the $\beta$ value of $LLR_n$ for the subset of row m. In at least some embodiments, the decoding section determines which probability values in the subset have the lowest confidence value as follows:

$$\left(\min_{mn}^{1st}, \min_{mn}^{2nd}, , \min_{mn}^{jth}\right) = \min_{n' \in A(m)\backslash n} J \left|\beta_{mn'}\right| \qquad \text{EQ. 6}$$

where $\min_{mn}$ represents a probability value having the kth lowest confidence value in the subset A(m), $|\beta_{mn'}|$ represents the confidence of the $\beta$ values of the LLR values in the subset A(m) other than the selected value, and n' represents the LLR values associated with the parity-check matrix row m.

At S762, the decoding section or a sub-section thereof determines the adjustment amount. In at least some embodiments, the decoding section determines the adjustment amount based on a number of minimum confidence values equal to the adjustment basis quantity. In at least some embodiments, the decoding section determines an adjustment amount equal to the minimum confidence value in response to the adjustment basis quantity being one. In at least some embodiments, the decoding section determines an adjustment amount equal to an average of the minimum confidence values in response to the adjustment basis quantity being more than one. In at least some embodiments, the decoding section determines an adjustment amount as follows:

$$f\min_{mn} = f\left(\min_{mn}^{1st}, \min_{mn}^{2nd}, , \min_{mn}^{jth}\right) \qquad \text{EQ. 7}$$

where $f\min_{mn}$ represents the adjustment amount.

At S764, the decoding section determines whether the sum of binary values in the subset is even. In response to determining that the sum of corresponding binary values is not even, the operational flow proceeds to confidence decrease at S765. In response to determining that the sum of corresponding binary values is even, the operational flow proceeds to confidence increase at S766.

At S765, the decoding section or a sub-section thereof decreases the confidence value of the selected probability value by the adjustment amount. In at least some embodiments, the probability value is adjusted to decrease confidence in the likely binary value in response to determining that the sum total of the likely binary values in the subset is not even. In at least some embodiments, the decoding section decreases the absolute value of the LLR value of the selected probability value. In at least some embodiments, the absolute value of the LLR value will become negative due to the decrease, causing the LLR value to represent the opposite binary value as the likely value.

At S766, the decoding section or a sub-section thereof increases the confidence value of the selected probability value by the adjustment amount. In at least some embodiments, the probability value is adjusted to increase confidence in a likely binary value in response to determining that a sum total of the likely binary values in the subset is even. In at least some embodiments, the decoding section increases the absolute value of the LLR value of the selected probability value.

In at least some embodiments, the decoding section performs the operations of S764, S765, and S766 as follows:

$$\alpha_{mn} = \left(\prod_{n' \in A(m)\backslash n} \text{sign}(\beta_{mn'})\right) * f\min_{mn} \qquad \text{EQ. 8}$$

where $\alpha_{mn}$ represents the adjustment value of $LLR_{mn}$ for the current iteration of probability value adjustment for the subset of row m, and $\prod_{n' \in A(m)\backslash n} \text{sign}(\beta_{mn'})$ represents the products of the sign bits of the $\beta$ values corresponding to LLR values in the subset A(m) other than the selected value. In other words, $\prod_{n' \in A(m)\backslash n} \text{sign}(\beta_{mn'})$ equals negative one where the sum of corresponding binary values is not even and equals positive one where the sum of corresponding binary values is even. The resulting sign bit of $\alpha_{mn}$ is such that $\beta_{mn}$ is biased towards the likely binary value that causes the sum of likely binary values in the subset to be even.

At S768, the decoding section determines whether all probability values in the subset have been adjusted. In response to the decoding section determining that unadjusted probability values remain, the operational flow returns to minimum confidence value determination at S760 after selecting the next probability value (S769). In response to the decoding section determining that all probability values in the subset have been adjusted, the operational flow ends. In at least some embodiments, adjustments to the probability values are not made until adjustment amounts of all probability values in the subset have been determined, and then the adjustments to all probability values in the subset are made at once.

Figure 8:
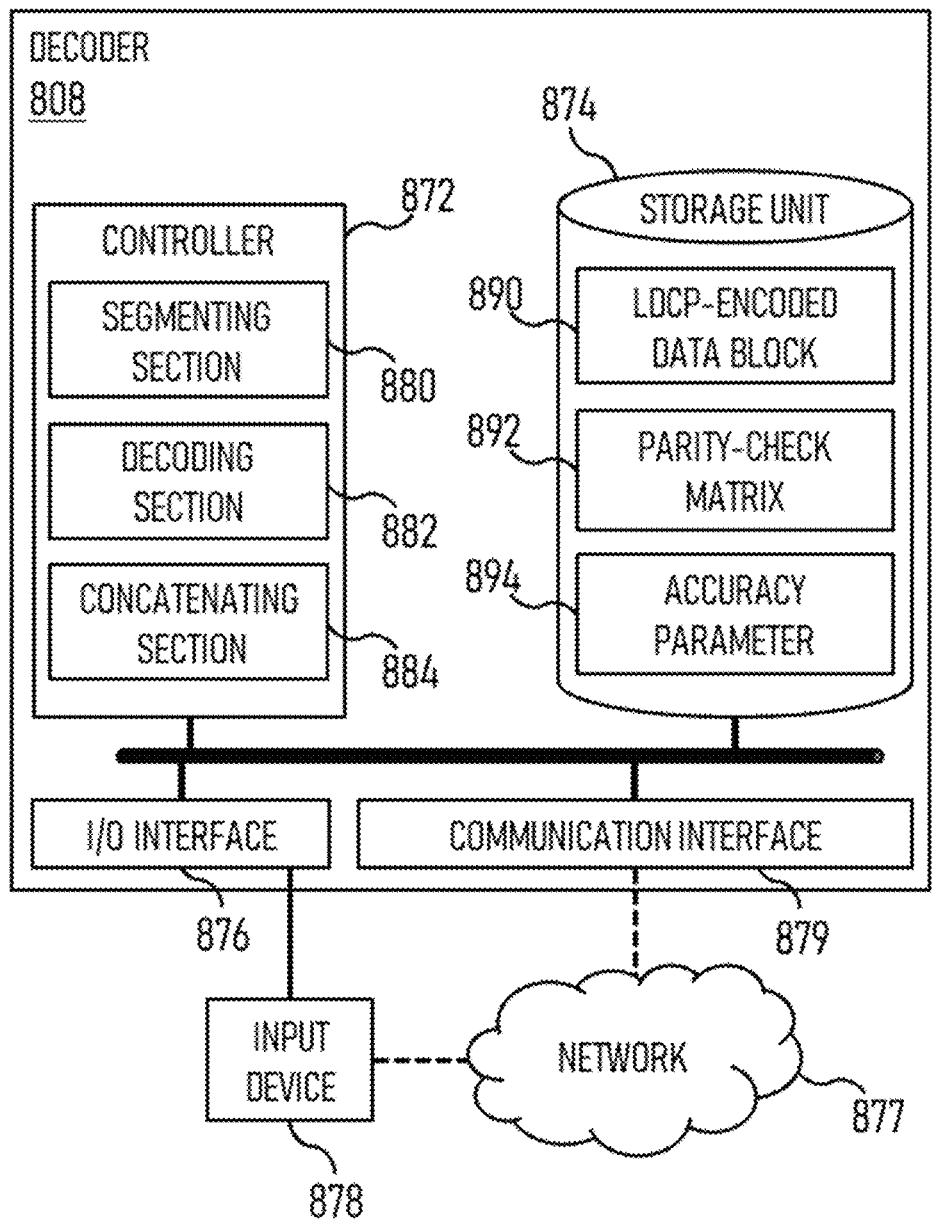
FIG. 8 is a block diagram of a hardware configuration for LDPC data decoding using iteration-variable accuracy, according to at least some embodiments of the present invention.

FIG. 8 is a block diagram of a hardware configuration for LDPC data decoding using iteration-variable accuracy, according to at least some embodiments of the present invention.

The exemplary hardware configuration includes decoder 808, which interacts with input device 878 directly or through network 877. In at least some embodiments, decoder 808 is a computer or other computing device that receives input or commands from input device 878. In at least some embodiments, decoder 808 is integrated with input device 878. In at least some embodiments, decoder 808 is a computer system that executes computer-readable instructions to perform operations for LDPC data decoding using iteration-variable accuracy.

Decoder 808 includes a controller 872, a storage unit 874, an input/output interface 876, and a communication interface 879. In at least some embodiments, controller 872 includes a processor or programmable circuitry executing instructions to cause the processor or programmable circuitry to perform operations according to the instructions. In at least some embodiments, controller 872 includes analog or digital programmable circuitry, or any combination thereof. In at least some embodiments, controller 872 includes physically separated storage or circuitry that interacts through communication. In at least some embodiments, storage unit 874 includes a non-volatile computer-readable medium capable of storing executable and non-executable data for access by controller 872 during execution of the instructions. Communication interface 879 transmits and receives data from network 877. Input/output interface 876 connects to various input and output units, such as input device 878, via a parallel port, a serial port, a keyboard port, a mouse port, a monitor port, and the like to accept commands and present information. In some embodiments, storage unit 874 is external from decoder 808.

Controller 872 includes segmenting section 880, decoding section 882, and concatenating section 884. Storage unit 874 includes LDCP-encoded data block 890, parity-check matrix 892, and accuracy parameter 894.

Segmenting section 880 is the circuitry or instructions of controller 872 configured to divide encoded data blocks of probability values into segments. In at least some embodiments, segmenting section 880 is configured to divide an encoded data block of probability values into a plurality of data probability value segments and a plurality of parity probability value segments, each probability value of the encoded data block representing a likelihood between binary values. In at least some embodiments, segmenting section 880 utilizes information in storage unit 874, such as LDCP-encoded data block 890 and parity-check matrix 892. In at least some embodiments, segmenting section 880 includes sub-sections for performing additional functions, as described in the foregoing flow charts. In at least some embodiments, such sub-sections is referred to by a name associated with a corresponding function.

Decoding section 882 is the circuitry or instructions of controller 872 configured to decode probability value segments. In at least some embodiments, decoding section 882 is configured to adjust, according to an iteration-variable accuracy parameter, probability values of the encoded data block based on a parity-check matrix, the parity-check matrix defining correspondence among data probability value segments and parity probability value segments, wherein the iteration-variable accuracy parameter represents a tradeoff between accuracy and computational efficiency. In at least some embodiments, decoding section 882 utilizes information in storage unit 874, such as parity-check matrix 892 and accuracy parameter 894. In at least some embodiments, decoding section 882 includes sub-sections for performing additional functions, as described in the foregoing flow charts. In at least some embodiments, such sub-sections is referred to by a name associated with a corresponding function.

Concatenating section 884 is the circuitry or instructions of controller 872 configured to concatenate decoded binary value segments. In at least some embodiments, concatenating section 884 is configured to concatenate likely binary values that satisfy the parity-check matrix associated with the probability values of each data probability value segment to form a decoded data block. In at least some embodiments, concatenating section 884 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in cach computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

In at least some embodiments, Low-Density Parity-Check (LDPC) data decoding using iteration-variable accuracy is performed by segmenting a LDPC encoded data block of probability values by dividing the LDPC encoded data block into a plurality of data probability value segments and a plurality of parity probability value segments, each probability value of the LDPC encoded data block representing a likelihood between binary values, decoding the LDPC encoded data block by adjusting, according to an iteration-variable accuracy parameter, the probability values of the LDPC encoded data block based on a parity-check matrix, the parity-check matrix defining correspondence among data probability value segments and parity probability value segments, and concatenating likely binary values that satisfy the parity-check matrix associated with the probability values of each data probability value segment to form a decoded data block. The iteration-variable accuracy parameter represents a tradeoff between accuracy and computational efficiency.

The foregoing outlines features of several embodiments so that those skilled in the art would better understand the aspects of the present disclosure. Those skilled in the art should appreciate that this disclosure is readily usable as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that various changes, substitutions, and alterations herein are possible without departing from the spirit and scope of the present disclosure.

What is claimed is:

1. A method comprising:
   segmenting, using a segmentation processor, a Low-Density Parity-Check (LDPC) encoded data block of probability values by dividing the LDPC encoded data block into a plurality of data probability value segments and a plurality of parity probability value segments, each probability value of the LDPC encoded data block representing a likelihood between binary values;
   decoding, using a decoding processor, the LDPC encoded data block by adjusting, according to an iteration-variable accuracy parameter, the probability values of the LDPC encoded data block based on a parity-check matrix, the parity-check matrix defining correspondence among data probability value segments and parity probability value segments, wherein the decoding includes
      comparing subsets of probability values, each subset including probability values that are related according to the parity-check matrix, the related probability values of each subset being from corresponding data probability value segments and parity probability value segments,
         wherein the probability values of each subset correspond to original binary values, a sum total of which is even, and
         wherein each probability value is included in more than one subset; and
      adjusting each probability value in each subset based on one or more minimum confidence probability values among other probability values in the subset,
         wherein each probability value is adjusted to increase confidence in a likely binary value in response to determining that a sum total of the likely binary values in the subset is even, and
         wherein each probability value is adjusted to decrease confidence in the likely binary value in response to determining that the sum total of the likely binary values in the subset is not even; and
   concatenating, using a concatenating processor, likely binary values that satisfy the parity-check matrix associated with the probability values of each data probability value segment to form a decoded data block.

2. The method of claim 1, wherein the decoding further includes
   determining, for each subset, an adjustment basis quantity, the adjustment basis quantity representing a quantity of minimum confidence probability values among the other probability values in the subset on which to base the adjusting;

wherein a quantity of the one or more minimum confidence probability values is the adjustment basis quantity; and wherein the adjustment basis quantity is less than or equal to a quantity of the other probability values in the subset.

3. The method of claim 2, wherein the decoding further includes performing iterations of adjusting each probability value in each subset;

determining, for each subsequent iteration of adjusting, the iteration-variable accuracy parameter based on an iteration value and an error rate of at least the previous iteration; and applying, for each subset, the adjustment basis quantity that is the lesser between the iteration-variable accuracy parameter and one less than a quantity of probability values in the subset.

4. The method of claim 3, wherein the error rate is a proportion of subsets in which the sum total of the likely binary values in the subset is even to all of the subsets.

5. The method of claim 3, wherein the error rate is a proportion of probability values in subsets in which the sum total of the likely binary values in the subset is even to all of the probability values.

6. The method of claim 3, wherein the determining the iteration-variable accuracy parameter further includes determining the iteration-variable accuracy parameter further based on a signal-to-noise ratio.

7. The method of claim 3, wherein the iterations of adjusting are performed until likely binary values associated with the probability values satisfy the parity-check matrix or until a predetermined number of iterations are performed.

8. A non-transitory computer-readable medium including instructions stored thereon that, when executed by one or more processors, cause the one or more processors to perform operations comprising:

segmenting, using a segmentation processor, a Low-Density Parity-Check (LDPC) encoded data block of probability values by dividing the LDPC encoded data block into a plurality of data probability value segments and a plurality of parity probability value segments, each probability value of the LDPC encoded data block representing a likelihood between binary values;

decoding, using a decoding processor, the LDPC encoded data block by adjusting, according to an iteration-variable accuracy parameter, the probability values of the LDPC encoded data block based on a parity-check matrix, the parity-check matrix defining correspondence among data probability value segments and parity probability value segments, wherein the decoding includes comparing subsets of probability values, each subset including probability values that are related according to the parity-check matrix, the related probability values of each subset being from corresponding data probability value segments and parity probability value segments, wherein the probability values of each subset correspond to original binary values, a sum total of which is even, and wherein each probability value is included in more than one subset; and adjusting each probability value in each subset based on one or more minimum confidence probability values among other probability values in the subset, wherein each probability value is adjusted to increase confidence in a likely binary value in response to determining that a sum total of the likely binary values in the subset is even, and wherein each probability value is adjusted to decrease confidence in the likely binary value in response to determining that the sum total of the likely binary values in the subset is not even; and concatenating, using a concatenating processor, likely binary values that satisfy the parity-check matrix associated with the probability values of each data probability value segment to form a decoded data block.

9. The computer-readable medium of claim 8, wherein the decoding further includes determining, for each subset, an adjustment basis quantity, the adjustment basis quantity representing a quantity of minimum confidence probability values among the other probability values in the subset on which to base the adjusting;

wherein a quantity of the one or more minimum confidence probability values is the adjustment basis quantity; and wherein the adjustment basis quantity is less than or equal to a quantity of the other probability values in the subset.

10. The computer-readable medium of claim 9, wherein the decoding further includes performing iterations of adjusting each probability value in each subset;

determining, for each subsequent iteration of adjusting, the iteration-variable accuracy parameter based on an iteration value and an error rate of at least the previous iteration; and applying, for each subset, the adjustment basis quantity that is the lesser between the iteration-variable accuracy parameter and one less than a quantity of probability values in the subset.

11. The computer-readable medium of claim 10, wherein the error rate is a proportion of subsets in which the sum total of the likely binary values in the subset is even to all of the subsets.

12. The computer-readable medium of claim 10, wherein the error rate is a proportion of probability values in subsets in which the sum total of the likely binary values in the subset is even to all of the probability values.

13. The method of claim 10, wherein the determining the iteration-variable accuracy parameter further includes determining the iteration-variable accuracy parameter further based on a signal-to-noise ratio.

14. The method of claim 10, wherein the iterations of adjusting are performed until likely binary values associated with the probability values satisfy the parity-check matrix or until a predetermined number of iterations are performed.

15. A device comprising:

a segmentation processor configured to divide an LDPC encoded data block of probability values into a plurality of data probability value segments and a plurality of parity probability value segments, each probability value of the LDPC encoded data block representing a likelihood between binary values;

a decoding processor configured to adjust, according to an iteration-variable accuracy parameter, the probability values of the LDPC encoded data block based on a parity-check matrix, the parity-check matrix defining correspondence among data probability value segments and parity probability value segments, compare subsets of probability values, each subset including probability values that are related according to the parity-check matrix, the related probability values of each subset being from corresponding data probability value segments and parity probability value segments,
- wherein the probability values of each subset correspond to original binary values, a sum total of which is even, and
- wherein each probability value is included in more than one subset, and adjust each probability value in each subset based on one or more minimum confidence probability values among other probability values in the subset,
- wherein each probability value is adjusted to increase confidence in a likely binary value in response to determining that a sum total of the likely binary values in the subset is even, and
- wherein each probability value is adjusted to decrease confidence in the likely binary value in response to determining that the sum total of the likely binary values in the subset is not even; and a concatenating processor configured to concatenate likely binary values that satisfy the parity-check matrix associated with the probability values of each data probability value segment to form a decoded data block.

16. The device of claim 15, wherein the decoding processor is further configured to determine, for each subset, an adjustment basis quantity, the adjustment basis quantity representing a quantity of minimum confidence probability values among the other probability values in the subset on which to base the adjusting;

wherein a quantity of the one or more minimum confidence probability values is the adjustment basis quantity; and wherein the adjustment basis quantity is less than or equal to a quantity of the other probability values in the subset.

17. The device of claim 15, wherein the device further includes, among the circuitry:

a parameter processor configured to transmit a plurality of parameters to each of the segmentation processor, the decoding processor, and the concatenating processor, wherein the plurality of parameters corresponds to the encoded data block.

* * * * *